Oct. 14, 1924.                                                                1,511,523
J. H. RUCKER
HANDLE FOR STEERING WHEELS
Filed Oct. 18, 1923
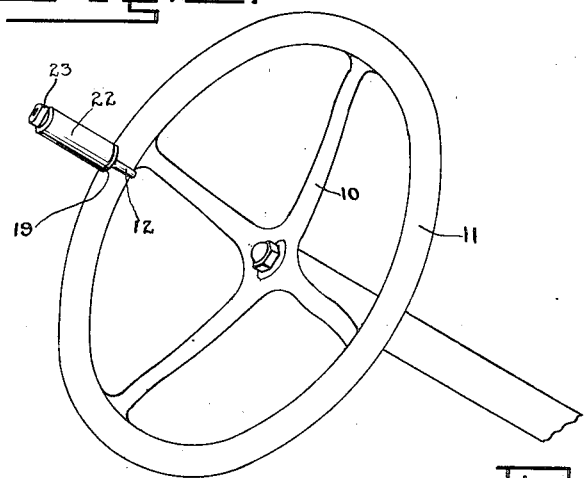
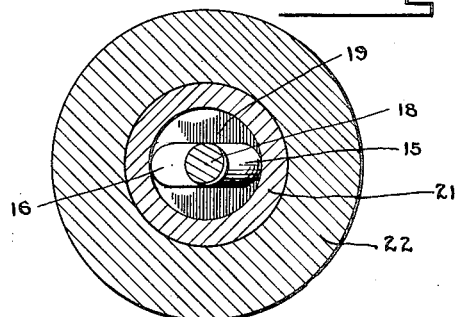
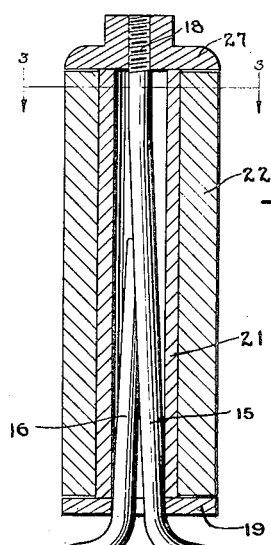
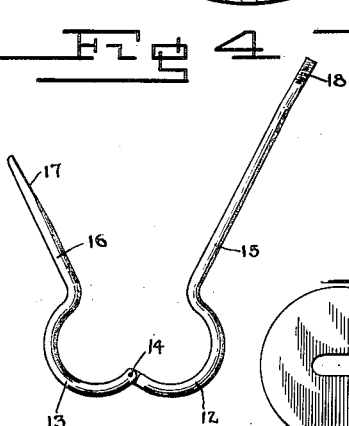
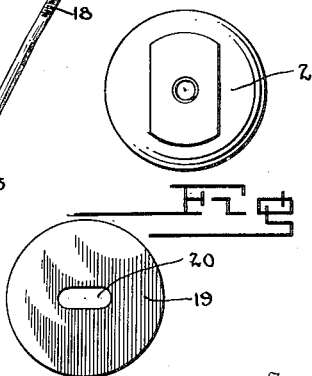
Inventor
John H Rucker
By Lancaster Allwine
Attorney Patented Oct. 14, 1924.

1,511,523

UNITED STATES PATENT OFFICE.

JOHN HAROLD RUCKER, OF IRVING, ILLINOIS.

HANDLE FOR STEERING WHEELS.

Application filed October 18, 1923. Serial No. 669,417.

*To all whom it may concern:*

Be it known that I, JOHN H. RUCKER, a citizen of the United States, residing at Irving, in the county of Montgomery and State of Illinois, have invented certain new and useful Improvements in a Handle for Steering Wheels, of which the following is a specification.

The present invention relates to steering wheels for automobiles and the like, and more particularly to an auxiliary handle for application to the steering wheel.

An object of the present invention is, to provide a handle of this type which may be applied to steering wheel rims of various sizes and which is arranged to yieldingly clamp upon the rim and which at the same time has a hand hold free to turn so as not to slip in the hand and thus injure the same.

Another object of the invention is to provide a handle of this type which comprises but few parts so constructed as to provide the necessary gripping or clamping action and which may be economically produced and easily assembled or mounted upon the steering wheel without mutilating or separating any of the parts thereof.

A further object of the invention is to provide a loop member hinged at one side and having converging spaced end portions at its other side and a clamping member slidable over the converging ends for drawing the same together to bind the loop on the rim of a steering wheel or the like so as to provide a device which is adjustable within reasonable limits and which may be tightened from time to time should the parts wear, shrink or otherwise become loose one upon the other.

The above and various other objects and advantages of this invention will be in part described in and in part understood from the following detailed description of the present preferred embodiment, the same being illustrated in the accompanying drawing, wherein:

Fig. 1 is a perspective view of a steering wheel provided with a handle constructed according to the present invention.

Fig. 2 is an enlarged central section taken longitudinally through the handle and the rim of the steering wheel.

Fig. 3 is a further enlarged transverse section taken through the same on the line 3—3 of Fig. 2.

Fig. 4 is a detail side elevation of the loop member opened and ready to be engaged about the rim.

Fig. 5 is an outer end view of the clamping nut or cap of the handle, and

Fig. 6 is a plan view of the clamping member employed.

Referring to the drawing 10 designates a steering wheel which is shown of conventional form and having a rim 11 adapted to be grasped in the ordinary manner for holding and turning the steering wheel during the operation of a motor vehicle or the like.

In order to facilitate the holding of the steering wheel and to ease the hands and wrists when it is necessary to operate the wheel for long periods of time, or when it is necessary to impart a number of turns to the wheel, such as when used on street rollers or the like, the present invention provides a handle which extends outwardly from the steering wheel 10 at right angles thereto so that the hand and wrist may remain in a perfectly normal position during the application of power to the wheel for turning and holding it.

The handle comprises a loop member made of heavy wire or the like in two sections 12 and 13 which may be semicircular or arched in suitable configuration for conforming at least generally to the contour of the rim 11 of the steering wheel. These loop members 12 and 13 are hinged together upon a pivot 14 at one side of the loop so that the members 12 and 13 may be swung upon the pivot 14 to open the other side of the loop as shown in Fig. 4 to receive the rim 11.

The loop members 12 and 13 have arms 15 and 16 at their free ends which are turned outwardly therefrom and which converge toward their extremities to provide a spindle at one side of the loop. The arm 15 of the loop 12 is preferably longer than the arm 16 and the latter is bevelled at its inner side and at its outer end, as at 17, so as to lie flat against the opposite arm 15 and thus impart a tapering formation to the spindle. The arm 15 extends beyond the arm 16 for a suitable distance and has its outer end 18 threaded and bent at a slight angle to a line axially with the spindle and to receive thereover the compressing and clamping member.

A disk 19 of suitable relatively hard metal is adapted to be slipped over the spindle and has an elongated slot 20 at its intermediate portion through which the converging arms 15 and 16 are adapted to extend. The disk 19 is forced downwardly over the arms 15 and 16 to contract the same at their lower ends and thus more or less close the loop member and bind the sections 12 and 13 thereof against the opposite sides of the rim 11. The disk 19 is forced downwardly by a tube 21 which is fitted over the spindle and of sufficient diameter to receive the arms 15 and 16, the diameter being substantially equal to the length of the slot 20 so as to assist the disk 19 in holding the arms 15 and 16 together. The disk 19 is thus disposed upon the compressed arms in such manner as to offer resistance to the spreading of the arms in a direction which is edgewise to the disk for obtaining the greatest resistance of the metal of the disk without providing a relatively thick or heavy disk.

Mounted to turn freely upon the tube 21 is a sleeve or hand hold 22 which may be of suitable material and external configuration. The disk 19 is of sufficient diameter to extend over the lower end of the handle 22 so as to support it while a cap nut 23 is threaded upon the upper end 18 of the spindle and binds against the upper end of the tube 21 to force it against the disk 19 and hold the latter when adjusted. The cap nut 23 is of sufficient diameter to cover the upper end of the hand hold 22 and prevent its slipping from the tube. The description herein has referred to the upper and lower ends of the parts and this relation is described merely on account of the disposition of the figures in the drawing because the improved handle may of course be clamped upon the support 11 in any angle so as to project up as shown or in any other direction.

In applying the device it is only necessary to open the loop member as shown in Fig. 4, slip the loop member upwardly about a rim 11 and close the loop member to bring the outer ends of the arms 15 and 16 together as closely as initially possible, slip the washer or disk 19 downwardly over the arms which form the spindle, slip the tube 21 over the spindle and against the disk, placing the hand hold over the tube 21 and finally screwing the cap nut 23 upon the threaded end 18 of the spindle to bind the tube against the disk. As the disk is forced down by the tube it draws the lower ends of the arms 15 and 16 together and binds the loop member on the rim 11.

The tube 21 may be of ordinary stock material while the only part of the device which need be of considerable strength to withstand the pressure of the arms 15 and 16 is the disk 19. This disk is relatively small and may be relatively thin because the parts are so assembled that the disk is presented with its edge to the arms and the maximum strength of the material is thus obtained.

It is of course understood that various changes and modifications may be made in the details of construction and design of the above specifically described device without departing from the spirit thereof, such changes and modifications being restricted only by the scope of the following claim.

What is claimed is:

A handle comprising a pair of members formed of rod-like material and each having one end portion forming a portion of a loop and its remaining portion providing a stem portion, the loop forming portions being pivotally connected for movement into and out of loop forming relation to each other and the stem portions being disposed to extend in converging relation when in an operative position with one stem portion having its free end in close engagement with the second stem portion intermediate the length thereof and the second stem portion having its free end portion threaded, a disk having an elongated slot receiving the converging portions of said stem portions, a sleeve fitting about the stem portions and having an internal diameter corresponding to the length of the slot in said disk, a hand hold rotatable upon said sleeve, and a cap nut screwed upon the threaded upper end of the second rod portion and engaging the end of said sleeve without having binding engagement with the hand hold.

JOHN HAROLD RUCKER.